United States Patent
Forwerck et al.

(10) Patent No.: US 10,124,778 B1
(45) Date of Patent: Nov. 13, 2018

(54) STROKE SENSOR ASSEMBLY

(71) Applicants: AUTOLIV ASP, INC., Ogden, UT (US); AUTOLIV NISSIN BRAKE SYSTEMS JAPAN CO., LTD., Nagano-ken (JP)

(72) Inventors: Joshua Forwerck, Ogden, UT (US); Yoshiteru Matsunaga, Nagano-ken (JP); Motoyasu Nakamura, Nagano-ken (JP)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 15/622,349

(22) Filed: Jun. 14, 2017

(51) Int. Cl.
| | |
|---|---|
| *B60T 7/04* | (2006.01) |
| *B60T 8/171* | (2006.01) |
| *G01D 5/14* | (2006.01) |
| *B60R 16/023* | (2006.01) |

(52) U.S. Cl.
CPC .......... *B60T 8/171* (2013.01); *B60R 16/0231* (2013.01); *B60T 7/042* (2013.01); *G01D 5/142* (2013.01); *B60T 2220/04* (2013.01); *B60T 2270/82* (2013.01)

(58) Field of Classification Search
CPC ... B60T 7/04; B60T 8/38; B60T 11/16; B60T 17/22
USPC .......................... 303/3, 15, 20, 114.1; 73/129
See application file for complete search history.

(56) References Cited

U.S. PATENT DOCUMENTS

| | | | |
|---|---|---|---|
| 6,886,333 B2 | 5/2005 | Feigel et al. | |
| 8,978,457 B2 | 3/2015 | Naether et al. | |
| 9,383,279 B2 | 7/2016 | Sim | |
| 2003/0075975 A1* | 4/2003 | Fulks | B60Q 1/44 303/113.4 |
| 2015/0158466 A1 | 6/2015 | Nakamura et al. | |
| 2016/0016567 A1* | 1/2016 | Jurgens | B60T 7/042 303/10 |

FOREIGN PATENT DOCUMENTS

DE 102014220358 A1 4/2016

* cited by examiner

*Primary Examiner* — Christopher P Schwartz
(74) *Attorney, Agent, or Firm* — Stephen T. Olson; Harness, Dickey & Pierce, P.L.C.

(57) ABSTRACT

A stroke sensor assembly for a vehicle braking system may include a stroke sensor, a sensor circuit board, and a sensor housing. The stroke sensor may be operable to detect a position of a piston within a hydraulic block. The sensor circuit board may be in communication with the stroke sensor and may be electrically connected to a plurality of terminals. The sensor housing may surround the stroke sensor and the sensor circuit board. The sensor housing may include a single mounting aperture for mounting the sensor housing to the hydraulic block. The sensor housing may include an integrally formed female electrical connector that at least partially houses the terminals. The female electrical connector may include an inlet opening through which a male electrical connector is received for electrical connection with the terminals. The female electrical connector may include one or more ramped surfaces defining the inlet opening.

20 Claims, 6 Drawing Sheets

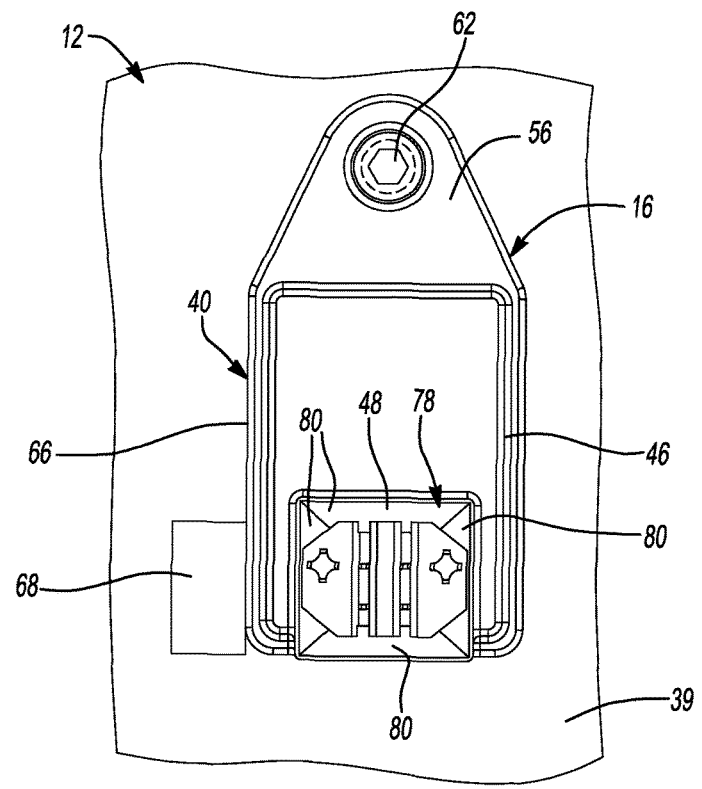
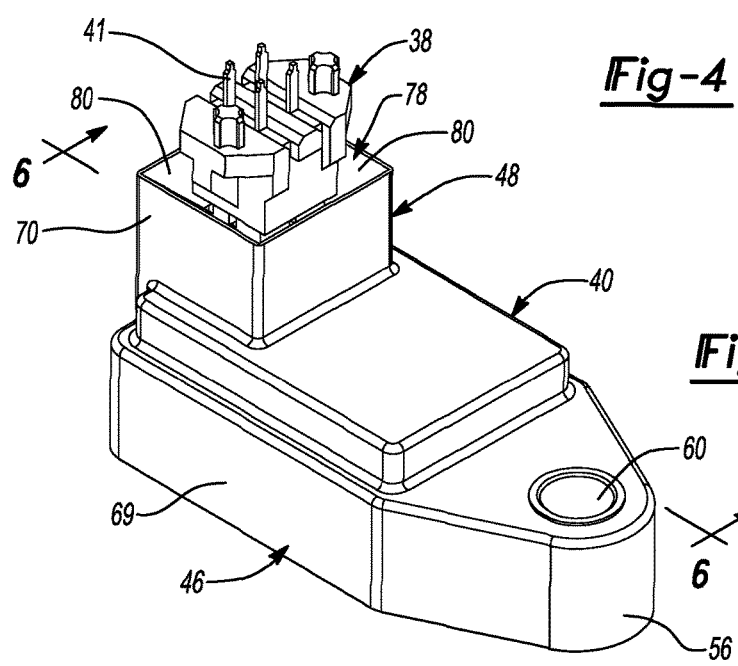
*Fig-4*
*Fig-5*

STROKE SENSOR ASSEMBLY

FIELD

The present disclosure relates to a stroke sensor assembly, and more particularly, to a stroke sensor assembly for a vehicle braking system.

BACKGROUND

This section provides background information related to the present disclosure and is not necessarily prior art.

Modern vehicles may include an electronically controlled braking system (e.g., a brake-by-wire system). Such braking systems can employ a stroke sensor to detect a position of a piston attached to a brake pedal. In this manner, the stroke sensor is able to detect a length of movement of the brake pedal when the brake pedal is depressed by the driver. An electronic control unit can determine an amount of braking force that is appropriate to slow or stop the vehicle based on the length of brake pedal movement detected by the stroke sensor. The electronic control unit can control a motor or other actuator that can actuate brake calipers with the appropriate amount of braking force to slow or stop the vehicle. The present disclosure provides a stroke sensor assembly and electronic control unit that can be incorporated into such an electronically controlled braking system.

SUMMARY

This section provides a general summary of the disclosure, and is not a comprehensive disclosure of its full scope or all of its features.

In one form, the present disclosure provides a stroke sensor assembly for a vehicle braking system. The stroke sensor assembly may include a stroke sensor, a sensor circuit board, and a sensor housing. The stroke sensor may be operable to detect a position of a piston within a hydraulic block. The sensor circuit board may be in communication with the stroke sensor and may be electrically connected to a plurality of terminals. The sensor housing may surround the stroke sensor and the sensor circuit board. The sensor housing may include a single mounting aperture for mounting the sensor housing to the hydraulic block. The sensor housing may include an integrally formed female electrical connector that at least partially houses the terminals. The female electrical connector may include an inlet opening through which a male electrical connector is received for electrical connection with the terminals. The female electrical connector may include one or more ramped surfaces defining the inlet opening.

In some configurations, the one or more ramped surfaces includes four ramped surfaces that are angled such that opposing ones of the ramped surfaces extend toward each other as they extend away from a distal end of the female electrical connector.

In some configurations, the male electrical connector includes a tapered distal end that cooperates with the ramped surfaces of the female electrical connector to guide the male electrical connector into the female electrical connector.

In some configurations, the sensor housing includes a potting material that fixes the sensor circuit board relative to the sensor housing and forms an exterior surface of the sensor housing that faces the hydraulic block.

In some configurations, the stroke sensor is electrically connected to an electronic control unit via the female and male connectors. The electronic control unit may include an ECU housing and an ECU circuit board. The ECU housing may be mounted to the hydraulic block and may define a cavity in which the ECU circuit board and the male connector are disposed.

In some configurations, an exterior side of the sensor housing contacts a protrusion formed on the hydraulic block. The protrusion may be positioned relative to the single mounting aperture such that the exterior side of the sensor housing is rotationally urged against the protrusion when a threaded fastener received in the mounting aperture is threadably tightened against the sensor housing.

In some configurations, the sensor housing includes a protrusion that is received in an aperture in the hydraulic block.

In some configurations, the sensor housing is mounted to an exterior surface of the hydraulic block.

In some configurations, the ECU housing forms a seal against the hydraulic block around the stroke sensor assembly.

In some configurations, the ECU housing includes a plate disposed between the ECU circuit board and the stroke sensor assembly. The male connector may be fixed to the plate.

In another form, the present disclosure provides a vehicle braking system that may include a hydraulic block, an electronic control unit, and a stroke sensor assembly. The hydraulic block may include a cylinder and a piston. The piston is movable within the cylinder and connected to a brake pedal. The electronic control unit may include an ECU housing and an ECU circuit board. The ECU housing may be mounted to the hydraulic block and may define a cavity in which the ECU circuit board is disposed. The ECU circuit board may be electrically connected to a first electrical connector disposed within the cavity. The stroke sensor assembly may include a sensor housing, a sensor circuit board, and a stroke sensor. The sensor housing may be mounted to the hydraulic block and may be disposed within the cavity of the ECU housing. The sensor circuit board may be disposed within the sensor housing and in communication with the stroke sensor. The stroke sensor may be disposed within the sensor housing and may be positioned relative to the cylinder such that the stroke sensor is operable to detect a position of the piston within the cylinder. The sensor housing may include an integrally formed second electrical connector that at least partially houses one or more terminals electrically connected to the sensor circuit board. The second electrical connector may include an inlet opening through which the first electrical connector is received for electrical connection with the one or more terminals. The second electrical connector may include one or more ramped surfaces defining the inlet opening.

In some configurations, the sensor housing is attached to the hydraulic block using a single threaded fastener.

In some configurations, the hydraulic block includes a protrusion contacting an exterior side of the sensor housing. The protrusion may be positioned relative to the single threaded fastener such that the exterior side of the sensor housing is rotationally urged against the protrusion when the single threaded fastener is threadably tightened against the sensor housing.

In some configurations, the hydraulic block includes a first aperture threadably receiving the single threaded fastener and a second aperture receiving a protrusion attached to and extending from the sensor housing.

In some configurations, the sensor housing is mounted to an exterior surface of the hydraulic block.

In some configurations, the ECU housing forms a seal against the hydraulic block around the stroke sensor assembly.

In some configurations, the one or more ramped surfaces includes four ramped surfaces that are angled such that opposing ones of the ramped surfaces extend toward each other as they extend away from a distal end of the second electrical connector.

In some configurations, the first electrical connector includes a tapered distal end that cooperates with the ramped surfaces of the second electrical connector to guide the first electrical connector into the second electrical connector when the electronic control unit is assembled onto the hydraulic housing.

In some configurations, the sensor housing includes a potting material that fixes the sensor circuit board relative to the sensor housing and forms an exterior surface of the sensor housing that faces the hydraulic block.

In some configurations, the ECU housing includes a plate disposed between the ECU circuit board and the stroke sensor assembly. The first connector may be fixed to the plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a plan view of the stroke sensor assembly mounted to the hydraulic block;

FIG. 5 is a perspective view of the stroke sensor assembly;

Corresponding reference numerals indicate corresponding parts throughout the several views of the drawings.

DETAILED DESCRIPTION

Figure 1:
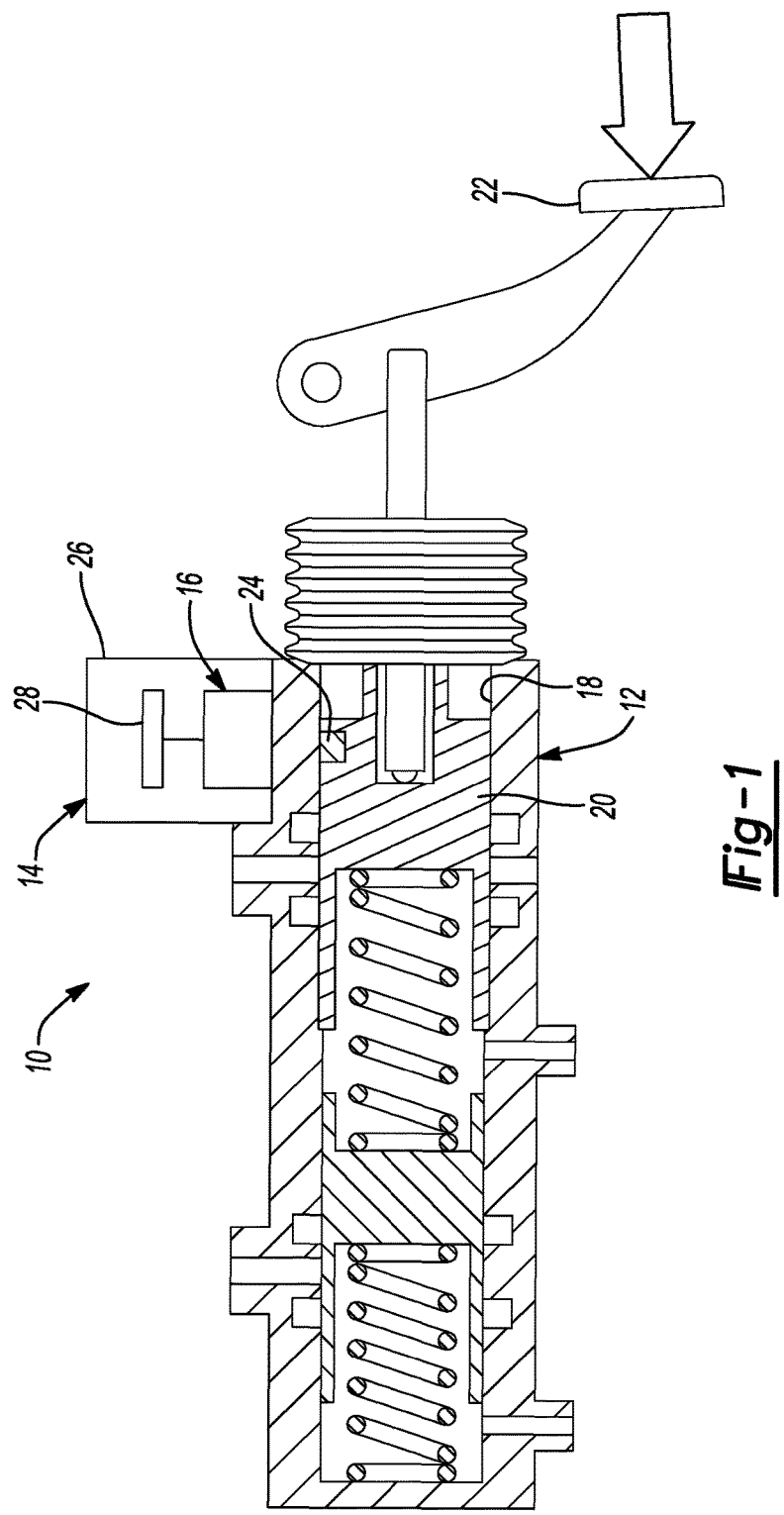
FIG. 1 is a schematic cross-sectional view of a braking system having a stroke sensor assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a braking system (e.g., a brake-by-wire system) 10 for a vehicle is provided that may include a hydraulic block or housing 12, an electronic control unit (ECU) 14, and a stroke sensor assembly 16. The hydraulic block 12 may include a cylinder 18 and a piston 20 that is movable within the cylinder 18. The piston 20 may be coupled to a brake pedal 22 such that when a driver of the vehicle depresses the brake pedal 22, the piston 20 moves within the cylinder 18. The piston 20 may include a magnet 24 embedded therein. The stroke sensor assembly 16 can detect a position of the piston 20 relative to the cylinder 18 (which is indicative of a position of the brake pedal 22) by detecting a position of the magnet 24 within the cylinder 18. The stroke sensor assembly 16 can communicate the detected position of the piston 20 to the ECU 14. The ECU 14 can determine an amount of braking force that is appropriate to slow or stop the vehicle based on the detected position of the piston 20.

Figure 2:
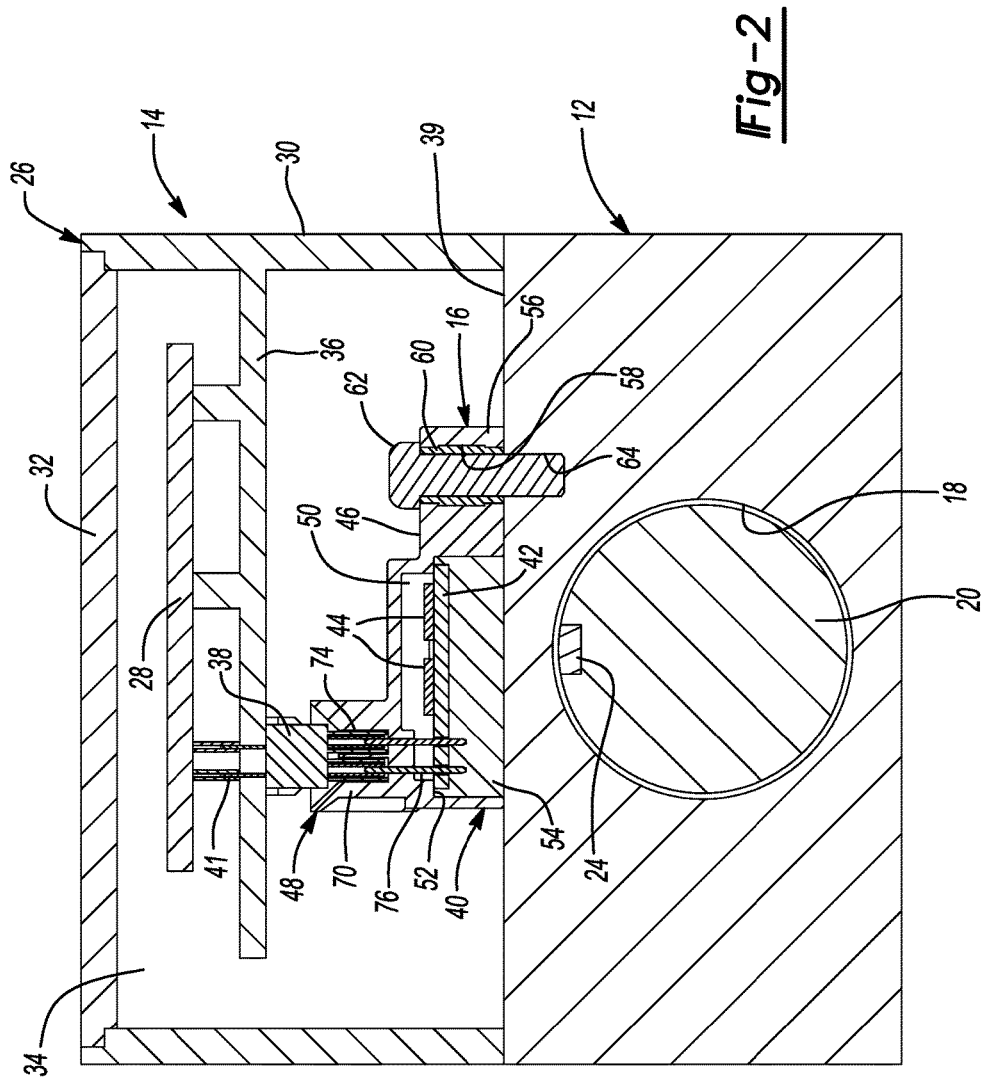
FIG. 2 is a cross-sectional view of the stroke sensor assembly and an electronic control unit mounted to a hydraulic block of the braking system.
Figure 3:
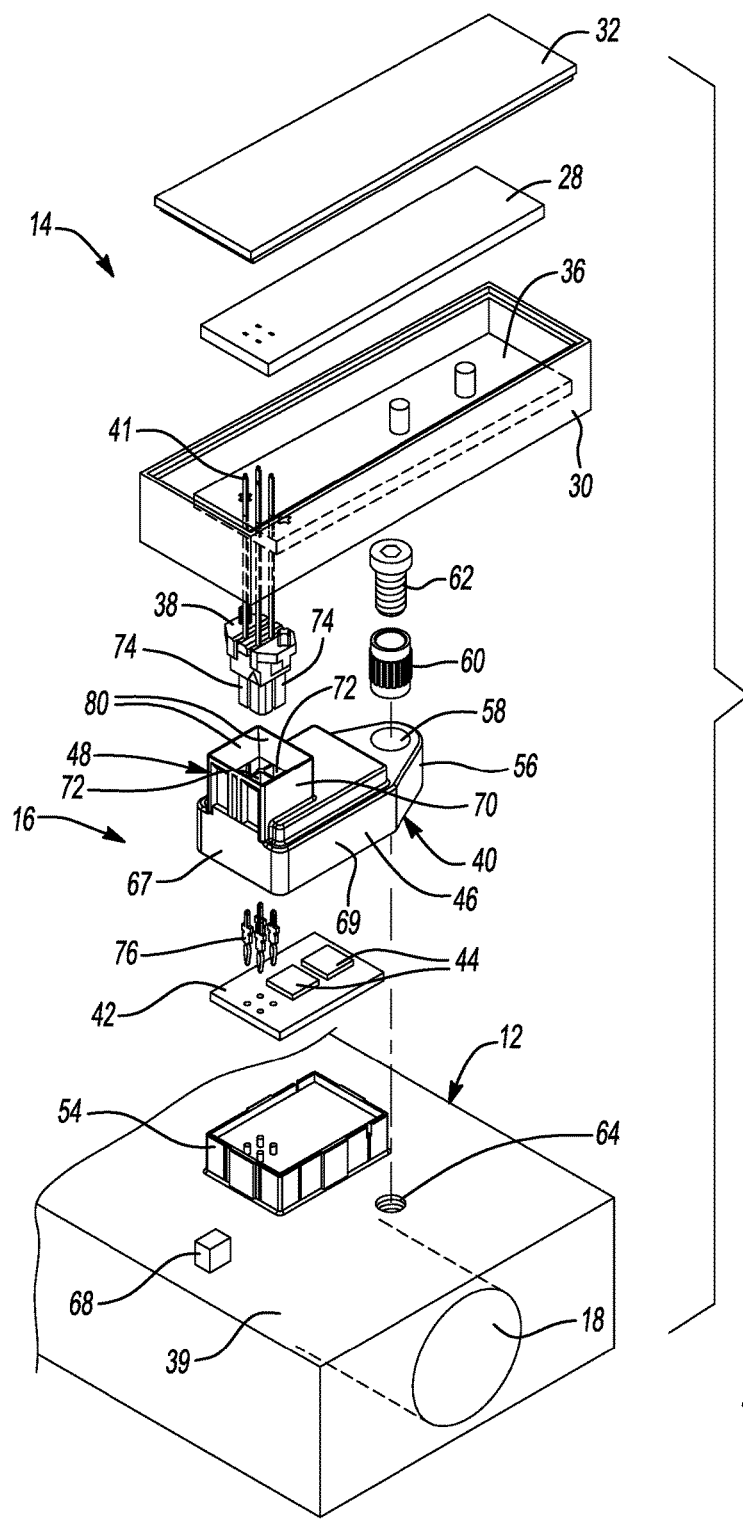
FIG. 3 is an exploded view of the stroke sensor assembly, electronic control unit and hydraulic block of FIG. 2.

Referring now to FIGS. 2 and 3, the ECU 14 may include an ECU housing 26 and an ECU circuit board 28 (shown schematically). In some configurations, the ECU housing 26 may include a shell body 30 and a lid 32. As shown in FIG. 2, the shell body 30 and the lid 32 may cooperate to define a cavity 34 in which the ECU circuit board 28 and the stroke sensor assembly 16 may be disposed. One end of the shell body 30 may sealingly engage the hydraulic block 12 and may be fixed to the hydraulic block 12 via fasteners, snap fit, welding and/or any other suitable attachment means. The lid 32 may sealingly engage the other end of the shell body 30 and may be fixed to the shell body 30 via fasteners, snap fit, welding and/or any other suitable attachment means. In this manner, the ECU housing 26 forms a sealed enclosure around the stroke sensor assembly 16.

The shell body 30 can include an intermediate mounting plate 36 attached thereto or integrally formed therewith. A first electrical connector (e.g., a male connector) 38 may be disposed within the cavity 34 and may be mounted to the intermediate mounting plate 36. The first electrical connector 38 may be electrically coupled to the ECU circuit board 28 via a plurality of terminals 41 that may extend through the intermediate mounting plate 36. In some configurations, the ECU circuit board 28 may be mounted to the intermediate mounting plate 36.

Referring now to FIGS. 2-7, the stroke sensor assembly 16 may be mounted to an exterior surface 39 of the hydraulic block 12 and may include a sensor housing 40, a sensor circuit board 42, and one or more stroke sensors 44 (e.g., Hall effect sensors configured to sense the position of the magnet 24 on the piston 20 within the cylinder 18). The sensor housing 40 may include a main body 46 and a second electrical connector (e.g., a female connector) 48 that is integrally formed with the main body 46. The main body 46 of the sensor housing 40 may define a cavity 50 in which the sensor circuit board 42 and stroke sensors 44 are disposed. The sensor circuit board 42 may abut a ledge 52 formed on the main body 46 within the cavity 50. The cavity 50 may receive a potting material 54 that fills an open end of the cavity 50 and fixes the sensor circuit board 42 within the cavity 50. The potting material 54 may be an epoxy (e.g., a two-part resin), for example, and may form and exterior surface of the sensor housing 40 that faces the exterior surface 39 of the hydraulic block 12.

The main body 46 of the sensor housing 40 may also include a mounting flange 56 having a mounting aperture 58 extending therethrough. The mounting aperture 58 may receive a bushing 60 and a threaded fastener 62. The threaded fastener 62 may threadably engage a threaded aperture 64 formed in the hydraulic block 12. As shown in FIG. 4, the hydraulic bock 12 may include a protrusion 68 (e.g., a block, ledge or lip) extending from the exterior surface 39 that contacts a first exterior side surface 66 of the main body 46. The contact between the protrusion 68 and the sensor housing 40 allows the stroke sensor assembly 16 to be securely fixed to the hydraulic block 12 using only a single fastener (i.e., the threaded fastener 62). That is, the protrusion 68 rotationally constrains the stroke sensor assembly 16 relative to the hydraulic block 12. Using only a single fastener to secure the stroke sensor assembly 16 to the hydraulic block 12 makes assembly of the braking system 10 simpler and faster. In the configuration shown in FIG. 4, threadably tightening the fastener 62 to clamp the sensor housing 40 to the hydraulic block 12 (i.e., rotating the fastener 62 in a clockwise direction when viewed from the frame of reference of FIG. 4) rotationally urges the sensor housing 40 against the protrusion 68 to more securely fix the sensor housing 40 to the hydraulic block 12.

Figure 8:
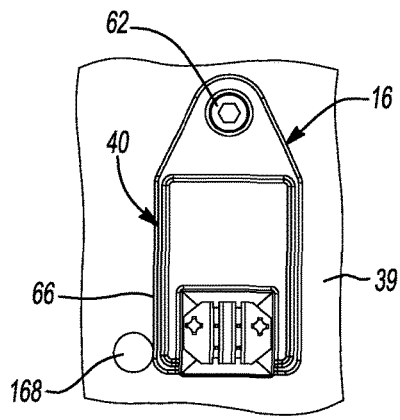
FIG. 8 is a plan view of the stroke sensor assembly mounted to an alternative hydraulic block.
Figure 9:
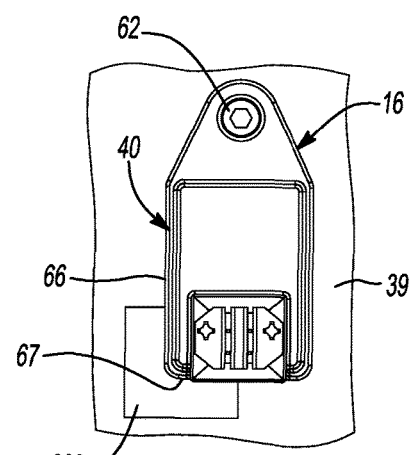
FIG. 9 is a plan view of the stroke sensor assembly mounted to another alternative hydraulic block.
Figure 10:
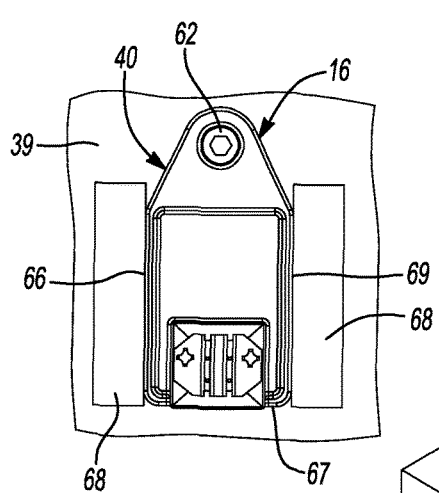
FIG. 10 is a plan view of the stroke sensor assembly mounted to yet another alternative hydraulic block.
Figure 11:
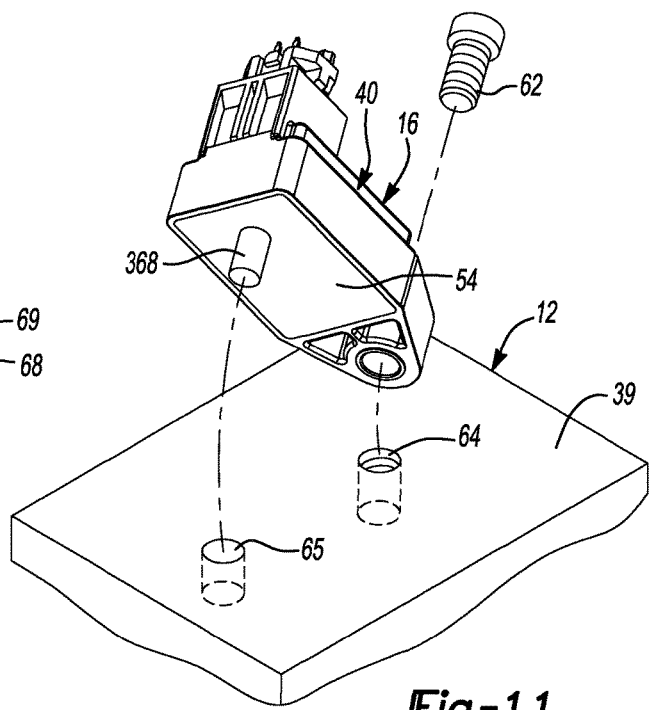
FIG. 11 is a plan view of an alternative stroke sensor assembly mounted yet another alternative hydraulic block.

While the protrusion 68 shown in FIGS. 3 and 4 is a rectangular prism contacting a single side (i.e., the first exterior side surface 66) of the sensor housing 40, in some configurations, the protrusion 68 could have other shapes and/or could contact other surfaces of the sensor housing 40. For example, FIG. 8 depicts an alternative protrusion 168 that has a cylindrical shape. As another example, FIG. 9 depicts another alternative protrusion 268 that has an L-shaped profile that contacts the first exterior side surface 66 and a second exterior side surface 67 of the sensor housing 40 that may be perpendicular to the first exterior side surface. As another example, FIG. 10 depicts a configuration of the hydraulic block having a pair of protrusions 68, one of which contacts the first exterior side surface 66 and the other of which contacts a third exterior side surface 69 opposite the first exterior side surface 66. As another example, FIG. 11 depicts an alternative configuration of the stroke sensor assembly 16 having a cylindrical protrusion (i.e., a pin) 368 extending outward from the potting material 54. The protrusion 368 may be received in an aperture 65 (e.g., a non-threaded aperture) in the hydraulic block 12.

Figure 6:
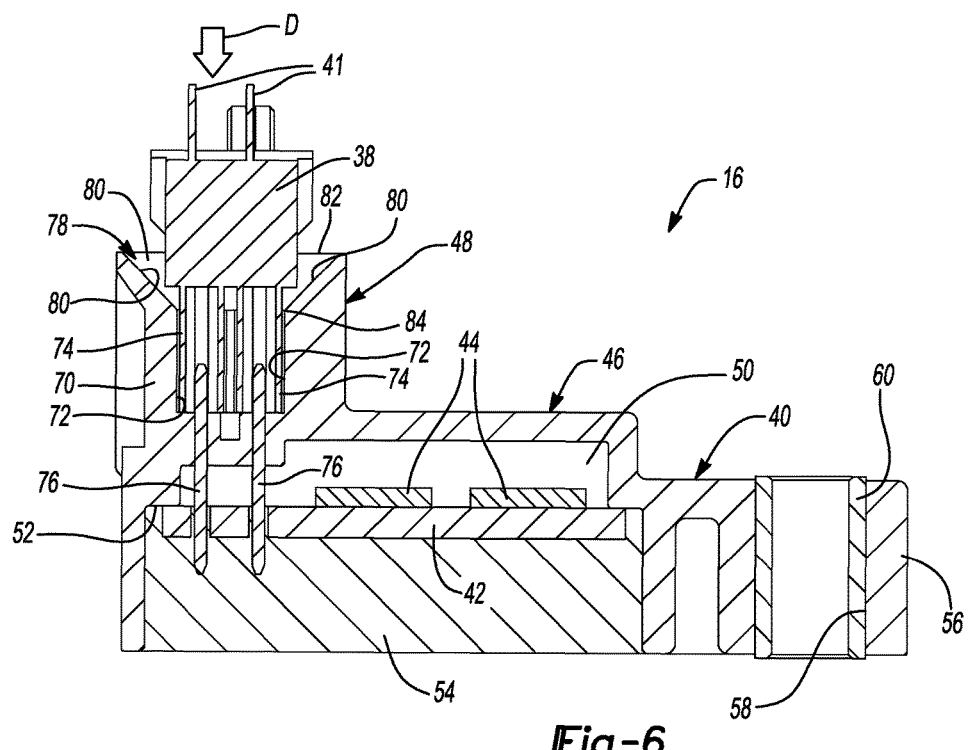
FIG. 6 is a cross-sectional view of the stroke sensor assembly taken along line 6-6 of FIG. 5.
Figure 7:
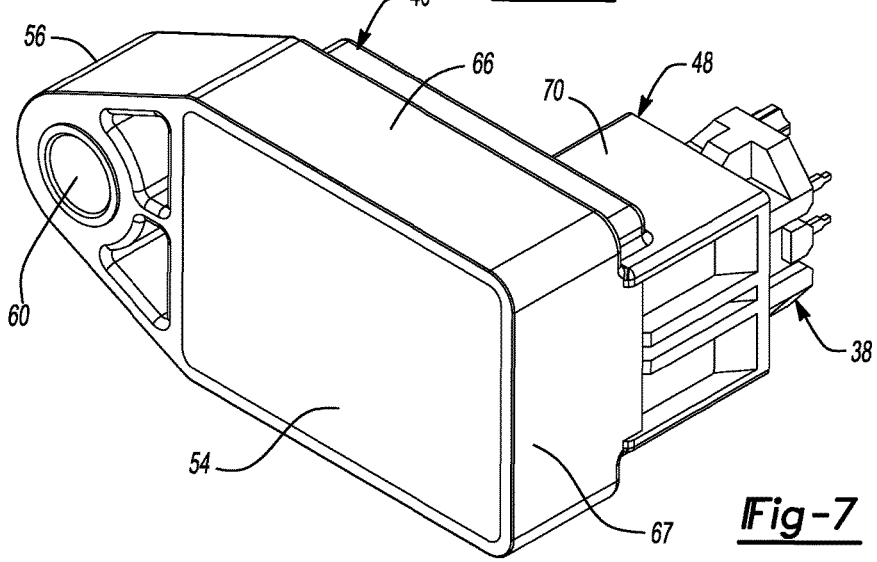
FIG. 7 is another perspective view of the stroke sensor assembly.

Referring again to FIGS. 2-7, the second electrical connector 48 of the sensor housing 40 may include a connector housing 70 that extends outward from the main body 46 of the sensor housing 40. As shown in FIG. 6, the connector housing 70 may include a plurality of passages 72 that receive legs 74 of the first electrical connector 38 and receive portions of a plurality of terminals 76. The fit between the legs 74 and the passages 72 may be a light press fit or a snap fit. The terminals 76 are in electrical communication with the sensor circuit board 42. When the legs 74 of the first electrical connector 38 are received within the passages 72 of the second electrical connector 48, the terminals 76 may be partially received in the legs 74 and in contact with the legs 74 such that the terminals 76 are in electrical communication with the terminals 41, thereby electrically connecting the sensor circuit board 42 with the ECU circuit board 28. The fit between the legs 74 and the terminals 76 may be a light press fit.

As shown in FIG. 6, a distal end of the connector housing 70 may define an inlet opening 78 through which the legs 74 of the first electrical connector 38 can be inserted into the passages 72. The inlet opening 78 may be defined by a plurality of ramped surfaces 80. The ramped surfaces 80 are angled relative to each other and relative to a direction D (FIG. 6) in which the first electrical connector 38 is inserted into the second electrical connector 48. That is, the ramped surfaces 80 are angled such that the inlet opening 78 has a larger perimeter at its distal end 82 and a smaller perimeter at its proximal end 84 adjacent the passages 72. The ramped surfaces 80 act as a funnel to facilitate insertion of the legs 74 of the first electrical connector 38 through the inlet opening 78 and into the passages 72. That is, the ramped surfaces 80 guide the legs 74 into the passages 72 as the first electrical connector 38 is inserted into the second electrical connector 48. In this manner, the ramped surfaces 80 facilitate blind insertion of the first electrical connector 38 into the second electrical connector 48 and allow for larger manufacturing tolerances. In some configurations, distal ends of the legs 74 of the first electrical connector 38 may be tapered to further facilitate blind insertion of the first electrical connector 38 into the second electrical connector 48.

With the first and second electrical connectors 38, 48 connected to each other, the sensor circuit board 42 is in electrical communication with the ECU circuit board 28 such that the position of the piston 20 sensed by the stroke sensors 44 can be communicated from the sensor circuit board 42 to the ECU circuit board 28. The ECU circuit board 28 may be in electrical communication with a motor can or other actuator (not shown) that can actuate brake calipers of the vehicle. The ECU circuit board 28 can control the motor or other actuator based on the sensed position of the piston 20 such that the brake calipers apply the appropriate amount of braking force to slow or stop the vehicle.

The ECU circuit board 28 and the sensor circuit board 42 may be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle braking system comprising:
a hydraulic block including a cylinder and a piston movable within the cylinder, the piston connected to a brake pedal;
an electronic control unit including an ECU housing and an ECU circuit board, the ECU housing mounted to the hydraulic block and defining a cavity in which the ECU circuit board is disposed, the ECU circuit board electrically connected to a first electrical connector disposed within the cavity; and
a stroke sensor assembly including a sensor housing, a sensor circuit board, and a stroke sensor, the sensor housing mounted to the hydraulic block and disposed within the cavity of the ECU housing, the sensor circuit board disposed within the sensor housing and in communication with the stroke sensor, the stroke sensor disposed within the sensor housing and positioned relative to the cylinder such that the stroke sensor is operable to detect a position of the piston within the cylinder, wherein the sensor housing includes an integrally formed second electrical connector that at least partially houses one or more terminals electrically connected to the sensor circuit board, the second electrical connector includes an inlet opening through which the first electrical connector is received for electrical connection with the one or more terminals, the second electrical connector including one or more ramped surfaces defining the inlet opening.

2. The vehicle braking system of claim 1, wherein the sensor housing is attached to the hydraulic block using a single threaded fastener.

3. The vehicle braking system of claim 2, wherein the hydraulic block includes a protrusion contacting an exterior side of the sensor housing, and wherein the protrusion is positioned relative to the single threaded fastener such that the exterior side of the sensor housing is rotationally urged against the protrusion when the single threaded fastener is threadably tightened against the sensor housing.

4. The vehicle braking system of claim 2, wherein the hydraulic block includes a first aperture threadably receiving the single threaded fastener and a second aperture receiving a protrusion attached to and extending from the sensor housing.

5. The vehicle braking system of claim 1, wherein the sensor housing is mounted to an exterior surface of the hydraulic block.

6. The vehicle braking system of claim 5, wherein the ECU housing forms a seal against the hydraulic block around the stroke sensor assembly.

7. The vehicle braking system of claim 1, wherein the one or more ramped surfaces includes four ramped surfaces that are angled such that opposing ones of the ramped surfaces extend toward each other as they extend away from a distal end of the second electrical connector.

8. The vehicle braking system of claim 7, wherein the first electrical connector includes a tapered distal end that cooperates with the ramped surfaces of the second electrical connector to guide the first electrical connector into the second electrical connector when the electronic control unit is assembled onto the hydraulic housing.

9. The vehicle braking system of claim 1, wherein the sensor housing includes a potting material that fixes the sensor circuit board relative to the sensor housing and forms an exterior surface of the sensor housing that faces the hydraulic block.

10. The vehicle braking system of claim 1, wherein the ECU housing includes a plate disposed between the ECU circuit board and the stroke sensor assembly, and wherein the first connector is fixed to the plate.

11. A stroke sensor assembly for a vehicle braking system, the stroke sensor assembly comprising:
a stroke sensor operable to detect a position of a piston within a hydraulic block;
a sensor circuit board in communication with the stroke sensor and electrically connected to a plurality of terminals; and
a sensor housing surrounding the stroke sensor and the sensor circuit board, the sensor housing having a single mounting aperture for mounting the sensor housing to the hydraulic block, the sensor housing including an integrally formed female electrical connector that at least partially houses the terminals, the female electrical connector including an inlet opening through which a male electrical connector is received for electrical connection with the terminals, the female electrical connector including one or more ramped surfaces defining the inlet opening.

12. The stroke sensor assembly of claim 11, wherein the one or more ramped surfaces includes four ramped surfaces that are angled such that opposing ones of the ramped surfaces extend toward each other as they extend away from a distal end of the female electrical connector.

13. The stroke sensor assembly of claim 12, wherein the male electrical connector includes a tapered distal end that cooperates with the ramped surfaces of the female electrical connector to guide the male electrical connector into the female electrical connector.

14. The stroke sensor assembly of claim 11, wherein the sensor housing includes a potting material that fixes the sensor circuit board relative to the sensor housing and forms an exterior surface of the sensor housing that faces the hydraulic block.

15. The stroke sensor assembly of claim 11, wherein the stroke sensor is electrically connected to an electronic control unit via the female and male connectors, the electronic control unit including an ECU housing and an ECU circuit board, the ECU housing is mounted to the hydraulic block and defines a cavity in which the ECU circuit board and the male connector are disposed.

16. The stroke sensor assembly of claim 15, wherein an exterior side of the sensor housing contacts a protrusion formed on the hydraulic block, and wherein the protrusion is positioned relative to the single mounting aperture such that the exterior side of the sensor housing is rotationally urged against the protrusion when a threaded fastener received in the mounting aperture is threadably tightened against the sensor housing.

17. The stroke sensor assembly of claim 15, wherein the sensor housing includes a protrusion that is received in an aperture in the hydraulic block.

18. The stroke sensor assembly of claim 15, wherein the sensor housing is mounted to an exterior surface of the hydraulic block.

19. The stroke sensor assembly of claim 18, wherein the ECU housing forms a seal against the hydraulic block around the stroke sensor assembly.

20. The stroke sensor assembly of claim 19, wherein the ECU housing includes a plate disposed between the ECU circuit board and the stroke sensor assembly, and wherein the male connector is fixed to the plate.

* * * * *